United States Patent [19]

Sansone

[11] Patent Number: 4,693,824

[45] Date of Patent: Sep. 15, 1987

[54] PROCESS FOR THE PRODUCTION OF POLYBENZIMIDAZOLE ULTRAFILTRATION MEMBRANES

[75] Inventor: Michael J. Sansone, Berkeley Heights, N.J.

[73] Assignee: Celanese Corporation, New York, N.Y.

[21] Appl. No.: 778,994

[22] Filed: Sep. 23, 1985

[51] Int. Cl.$^4$ ................................................ C08J 9/28
[52] U.S. Cl. .................................. 210/500.28; 264/41
[58] Field of Search ...................... 264/41; 210/500.28

[56] References Cited

U.S. PATENT DOCUMENTS 3,720,607 3/1973 Brinegar ............................... 210/654
3,841,492 10/1974 Brinegar ........................... 264/41 X Primary Examiner—Philip Anderson
Attorney, Agent, or Firm—Lynch, Cox & Gilman

[57] ABSTRACT

This invention relates to the preparation of ultrafiltration polybenzimidazole membranes in a coagulation bath comprised of a solvent and a non-solvent for the polybenzimidazole.

16 Claims, No Drawings

PROCESS FOR THE PRODUCTION OF POLYBENZIMIDAZOLE ULTRAFILTRATION MEMBRANES

BACKGROUND OF INVENTION

1. Field of Invention

This invention relates to a process for the production of polybenzimidazole membranes. More particularly, the invention relates to an improved process for the production of polybenzimidazole membranes that can be utilized in ultrafiltration.

2. Prior Art

Semipermeable membranes proposed in the past have been formed from a variety of materials, and are characterized by the ability to permit one component (e.g., ions or molecules) of a solution to pass through the membrane to the substantial exclusion of other components (e.g., other ions or molecules). Examples of substances heretofore recognized to possess this property include cellophane (i.e., regenerated cellulose), cellulose esters (e.g., cellulose acetate, cellulose butyrate, etc.), animal or protein membranes, polyelectrolyte complexes, ethyl cellulose, cross-linked polyacrylates, etc.

The semipermeable membranes of the prior art are of limited applicability in many separatory processes, such as reverse osmosis or ultrafiltration, because of inherent disadvantages relating to their chemical stability, strength, thermal stability, efficiency, length of life, and cost. Generally, the prior art membranes exhibit low thermal stability and, therefore, cannot be used successfully under conditions wherein the liquid undergoing treatment is at an elevated temperature. This may be a decided disadvantage in situations where the components to be separated only exist in solution at higher temperatures, or when it is economically advantageous to separate components of a solution at elevated temperatures rather than going through the expense of cooling. Furthermore, some membranes exhibit a decided decrease in efficiency upon an increase in temperature or pressure thereby limiting their range of applicability. Solvent susceptibility may be another factor affecting the applicability of a particular porous membrane to a separation process. Additionally, semipermeable membranes may be inappropriate for a particular application due to low solute rejection values or low flux.

Other factors which render the semipermeable membranes of the prior art of limited usefulness include their limited strength and chemical resistance and their extremely short operating lives at high pressures and temperatures. Low strength properties have generally been manifest in the form of the inability of the prior art films to operate at pressures in excess of about 1,000 p.s.i. or to operate at lower pressures for extended periods of time, especially at temperatures in excess of about 50° C. Furthermore, in general commercial usage it is necessary that membranes be strong enough to withstand shipment, storage and general rough handling. Thus, the continued need to replace the prior art membranes due to mechanical failures has greatly limited their commercial usefulness.

In an attempt to overcome certain of the above-noted disadvantages of prior art membranes, membranes comprised of polybenzimidazole polymers have been provided. See, for example, U.S. Pat. Nos. 3,699,038, 3,720,607, 3,737,042, 3,841,492, 3,851,025, 4,020,142, 4,448,687 and 4,512,894. Such membranes, however, are fragile and contain many voids or finger-like incursions in the membrane structure that reduce their strength and plurality.

In the prior art, the polybenzimidazole membranes were coagulated in a non-solvent for the polybenzimidazole polymer. The non-solvent was preferably aqueous in nature and most preferably water.

Accordingly, it is an object of this invention to provide an improved process for the production of semipermeable polybenzimidazole membranes that can be utilized in ultrafiltration.

It is also an object of the invention to provide a process for the production of polybenzimidazole membranes which exhibit improved mechanical properties.

It is a further object of the invention to provide improved semipermeable membranes possessing chemical and thermal stability.

These and other objectives are obtained by preparing polybenzimidazole membranes by the process of the instant invention.

SUMMARY OF INVENTION

This invention involves an improved process for the production of improved polybenzimidazole membranes useful in reverse osmosis or ultrafiltration. The improvement consists of coagulating the polybenzimidazole membrane in a bath containing about 50 to 70 percent by weight of the total weight based on the bath solution of a solvent for polybenzimidazole.

The process comprises the following steps:

(a) providing a solution of a polybenzimidazole polymer in a solvent capable of dissolving a polymer;

(b) depositing a film of the solution upon a support;

(c) removing an amount of solvent from the film sufficient to result in the formation of a thin solid layer on the exposed surface of the film having a density which is substantially greater than the remaining portion of the film on which the solid layer of increased density is formed; and (d) placing the film in a coagulation bath containing a non-solvent, such as water, and a solvent, such as dimethylacetamide, for the polybenzimidazole to produce a semipermeable membrane.

DETAILED DESCRIPTION OF INVENTION

A. The Starting Material

The polymeric material used to form the semipermeable membranes of the present invention is a linear polybenzimidazole. Polybenzimidazoles are a known class of heterocyclic polymers. Typical polymers of this class and their preparation are more fully described in U.S. Pat. No. 2,895,948, U.S. Pat. No. 26,065, and in the Journal of Polymer Science, Vol. 50, pages 511-539 (1961) which are herein incorporated by reference. The polybenzimidazoles consist essentially of recurring units of the following Formulas I and II. Formula I is:

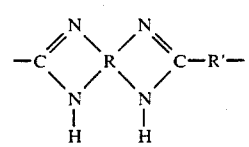

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

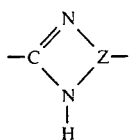

wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of the recurring units of Formula I wherein R' is an aromatic ring or a heterocyclic ring and Formula II.

As set forth in U.S. Pat. No. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heterocyclic dicarboxylic acid wherein the carboxyl groups are substituents upon a carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'(m-phenylene)-5,5'-bibenzimidazole;
poly-2,2'-(pyridylene-3",5"')-5,5'-bibenzimidazole;
poly-2,2'-(furylene-2",5"')-5,5'-bibenzimidazole;
poly-2,2'-(naphthalene-1",6")-5,5'-bibenzinidazole;
poly-2,2'-(biphenylene:4",4"')-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'(m-phenylene)-5,5'-di(benzimidazole)ether;
poly-2,2'(m-phenylene)-5,5'-di(benzimidazole)sulfide;
poly-2,2'(m-phenylene)-5,5'-di(benzimidazole)sulfone;
poly-2,2'(m-phenylene)-5,5'-di(benzimidazole)methane;
poly-2',2"(m-phenylene)-5,5"-di(benzimidazole)propane-2,2;
and poly-2,2'-(m-phenylene)-5',5"-di(benzimidazole)ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

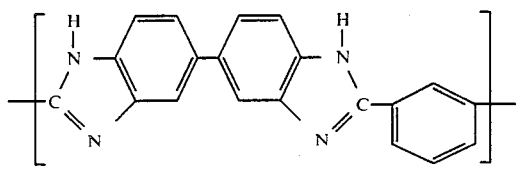

Any polymerization process known to those skilled in the art may be employed to prepare the polybenzimidazole which may then be formed into a semipermeable membrane. Representative techniques for preparing the polybenzimidazole are disclosed in U.S. Pat. Nos. 3,509,108, 3,549,603, 3,551,389, 4,312,976, 4,452,971, 4,452,972, 4,483,977 and 4,485,232 which are assigned to the assignee of the present invention and are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3. The inherent viscosity (I.V.) as used herein is determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second state polymerization reaction zone wherein it is heated under substantially oxygen-free conditions, as described above, to yield a polybenzimidazole polymer product, desirably having an I.V., as measured above, of at least 0.4, e.g., 0.8 to 1.1 or more.

The temperature employed in the second stage is at least 250° C., preferably at least 325° C., and more preferably from about 350° to 425° C. The second stage reaction generally takes at least 0.5 hour, and preferably from about 1 to 4 hours or more. It is, of course, also possible to prepare the instant polymers via a one-step reaction. However, the previously-described two-step process is preferred.

B. The Polymer Solution

The solvents utilized to form the polybenzimidazole polymer solutions from which semipermeable membranes are cast include those solvents which are commonly-recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethyl acetamide, N,N-dimethyl formamide, dimethyl sulfoxide, and N-methyl-2-pyrrolidone. The particularly preferred solvent is N,N- dimethyl acetamide. Additional representative solvents include formic acid, acetic acid, and sulfuric acid.

The polymer solutions may be prepared, for example, by dissolving sufficient polybenzimidazole in the solvent to yield a final solution containing from about 5 to 30 percent by weight of polymer based on the total weight of the solution, and preferably from about 10 to 22 percent by weight.

The quantity of polybenzimidazole dissolved in the solvent should be such that the resulting solution has a viscosity of about 50 to 4,000 poise at 30° C., and preferably about 50 to 300 poise and most preferably about 80 to 170 poise.

One suitable means for dissolving the polymer in the solvent is by mixing the materials at a temperature above the normal boiling point of the solvent, for example, about 25° to 120° C. above such boiling point, and at a pressure of 2 to 15 atmospheres for a period of 1 to 5 hours. The resulting solutions are preferably filtered to remove any undissolved polymer. A minor amount of lithium chloride optionally may be provided in the solution in accordance with the teachings of U.S. Pat. No. 3,502,606. The lithium chloride serves the function of preventing the polybenzimidazole polymer from phasing out of the solution upon standing for extended periods of time. Preferably about 0.1 to about 5 percent by weight of lithium chloride based on the total solution weight is added, and most preferably about 1 to 4 percent.

C. Semipermeable Flat Film Membrane Formation

The solution of polybenzimidazole polymer is deposited upon a support to form a wet film of the same. The nature of the support is not critical and may be selected from a variety of materials including ceramic, glass, or metallic plates (e.g., stainless steel). The support is preferably provided with retaining elements, or raised edges, whereby the solution is confined to the surface thereof at the desired location until its consistency is such that retaining elements are no longer needed. Numerous techniques are available for the application of the solution to the support as will be apparent to those skilled in the art. For instance, the polybenzimidazole polymer solution may be simply poured upon a level support in a quantity sufficient for it to assume the desired uniform thickness. A blade is then drawn over the surface of the wet film to aid the deposition of a wet film of uniform thickness.

The thickness of the wet film deposited upon the support is influenced by the desired thickness of the polybenzimidazole semipermeable membrane ultimately to be produced. Generally, the wet film is deposited upon the support in a substantially uniform thickness of about 0.5 to 30.0 mils and preferably about 1.0 to 10.0 mils. In a particularly preferred embodiment of the invention, the wet film is deposited in a thickness of about 1.0 to 5.0 mils.

A quantity of solvent is next evaporated from the exposed surface of the wet film to allow the formation of a relatively thin solid layer (i.e., a thin porous polymeric film) on the exposed surface of the film. The thin solid layer commonly exhibits a thickness of about 0.01 to 20 microns and preferably about 1 to 10 microns. During the formation of the solid layer on the exposed surface of the film, the solvent present near the surface of the wet film is flashed off and a thin coagulated solid layer of skin of polybenzimidazole polymer remains.

The evaporation of solvent from the exposed surface of the wet film may be accomplished by a variety of techniques as will be apparent to those skilled in the art. For instance, a stream of air or another gas at ambient or at an elevated temperature (e.g. approaching the boiling point of the solvent) may be simply directed at the exposed surface of the wet film. Other methods of evaporation and a process for the preparation of semipermeable membranes are described in U.S. Pat. No. 4,512,894 which is hereby incorporated by reference. The time required to form the desired thin solid layer upon the exposed surface of the wet film commonly ranges from about 5 seconds to 30 minutes, and preferably from about 15 seconds to 5 minutes.

The resulting film, bearing a thin solid layer upon its surface, is next converted to a semipermeable membrane by placing the film in a coagulation bath. The coagulation bath of the instant invention contains a mixture a solvent and a non-solvent for the polybenzimidazole. The preferred non-solvent is water. The preferred solvents are N,N-dimethylacetamide, N,N-dimethyl, formamide, dimethyl sulfoxide and N-methyl-2-pyrrolidone, with dimethylacetamide being most preferred. The solvent is present in the range of about 5 to 85 percent by weight of the total bath solution, and the non-solvent is present in the range of about 95 to 15 percent by weight of the total bath solution. Higher amounts of the solvent tend to dissolve the film; lower amounts do not produce the ultrafiltration properties which are desired. The preferred range of solvent is about 10 to 70 percent by weight of the total bath solution most preferably about 40 to 70 percent. The coagulation bath is maintained at a temperature in the range of about 0° to 40° C., preferably about 20° to 25° C. The film is held in a coagulation bath for about 30 seconds to about 20 minutes and preferably 2 to 5 minutes.

Instead of employing the solvents specified above, an acidic solvent such as sulfuric acid, acetic acid or formic acid may be employed. However, the acid solvents should be present in the coagulation bath at only about the 0.5 to 5 percent by weight level, preferably about 1 to 3 percent by weight. The presence of higher levels of acid in the coagulation bath results in the formation of films which contain physical holes which destroy ultrafiltration properties.

After the coagulation of the membrane, the membrane optionally may be annealed in accordance with the teachings of U.S. Pat. No. 4,512,894.

The resulting membrane, formed of polybenzimidazole polymer, consists of an outer relatively thin semipermeable surface layer formed during the evaporation step adjacent to a relatively thick layer of a more porous structure. The membranes are characterized by the presence of few or no internal finger-like voids and by high thermal and dimensional stability. When the coagulation bath is a 60/40 percent by weight dimethylacetamide/water solution, the internal voids are almost nonexistent. When the bath solution is a 70/30 percent by weight dimethylacetamide/water mixture, the internal voids completely disappear.

The membranes of this invention can withstand temperatures during use in excess of 125° C. Also, the membranes exhibit a high degree of chemical stability, and can continue to function in spite of contact with a wide variety of solvents. The membranes also exhibit a reduced tendency to crack. The membranes exhibit a flux rate of between 300 and 2100 gfd at 400 psi.

The polybenzimidazole membranes of the present invention, once positioned upon a conventional porous support, such as a porous steel plate, may be utilized to separate components of a solution by a variety of techniques. The polybenzimidazole membranes of the present invention are particularly suited for use in ultrafiltration.

The following examples are given as specific illustrations of the invention. It should be understood, however, that the invention is not limited to the specific details set forth in the examples.

EXAMPLE 1

A polybenzimidazole membrane based upon 2,2'-(m-phenelyene)-5,5'bibenzimidazole having an inherent viscosity of 0.8 was prepared from a dope containing 21 percent by weight of the polymer, 2 percent by weight of lithium chloride and 77 percenyt by weight of dimethylacetamide. The dope was cast as a film at a rate of 9.5 inches per 3.8 seconds on a non-woven polyester fabric marketed by Eaton-Dikeman under the trademark Hollytex. The film was then heated in an oven for 30 seconds at a temperature of 30° C. and an air velocity of 600 linear feet per minute to form a thin solid layer. The film was then coagulated in a coagulation bath for 40 seconds at 25° C. to form a semipermeable membrane. The coagulation bath was comprised of 70 percent by weight dimethylacetamide and 30 percent by weight water based upon the total weight of the bath solution.

The membrane which resulted was inserted in an Osmonics, Inc. flow loop, flow measurement device and subjected to a 0.5 percent by weight salt water solution with a membrane pressure of 400 psi. The flux of the membrane was 2100 gfd, and the salt rejection percentage was 0. Thus the membrane provided an excellent flux rate and was useful in ultrafiltration.

EXAMPLE 2

A membrane was formed under the same conditions as set forth in Example 1 except that the film was coagulated in water instead of a mixture of water and dimethylacetamide. The membrane exhibited a flux of 450 gfd and a salt rejection of about 1.5 percent. When the Example 1 membrane, which had been coagulated in the 70/30 dimethylacetamide/water bath was analyzed, the finger-like voids or incursions present in prior art polybenzimidazole membranes were absent. However, the 100 percent water coagulated membrane of Example 2 exhibited many finger-like voids. As the above example demonstrate, coagulation of polybenzimidazole membranes in a water/dimethylacetamide bath significantly increase the flux rate of the polybenzimidazole membrane and reduces the presence of finger-like voids or incursions.

EXAMPLE 3

Example 1 is repeated except that the coagulation bath is comprised of 98 percent by weight water and 2 percent by weight concentrated sulfuric acid. A membrane having properties similar of those exhibited by the membrane of Example 1 is prepared.

What is claimed is:

1. A process for the production of a semipermeable polybenzimidazole membrane comprising:
   (a) forming a solvent solution of a polybenzimidazole polymer;
   (b) depositing a film of said solution upon a support;
   (c) evaporating at least a part of said solvent from said film to form a solid layer on the exposed surface of said film; and
   (d) coagulating said film in a coagulation bath comprised of a solvent, selected from the group consisting of an acid, present at the 0.5 to 5 percent by weight level, N,N-dimethylacetamide, N,N-dimethylformamide, dimethyl sulfoxide and N-methyl-2-pyrrolidone, present in the range of about 5 to about 85 percent by weight based on the total weight of the coagulation bath, and a non-solvent for said polymer present in the range of about 99.5 to about a 15 percent by weight based on the total weight of the coagulation bath and thereby producing a semipermeable membrane.

2. In an improved process for the production of a semipermeable polybenzimidazole membrane wherein a solvent solution of a polybenzimidazole polymer is formed, a film of said solution is deposited upon a support, a solid layer is formed on the exposed surface of said film, and a semipermeable membrane is formed by coagulating said film in a coagulation bath, the improvement comprising the coagulation of said membrane in a coagulation bath comprised of a solvent selected from the group consisting of an acid, present at a 0.5 to 5 percent by weight level, N,N-dimethylacetamide, N,N-dimethylformamide, dimethyl sulfoxide and N-methyl-2-pyrrolidone, present at about a 5 to about an 85 percent by weight level based on the total weight of the coagulation bath and a non-solvent for said polybenzimidazole polymer present at about a 99.5 to about a 15 percent by weight level based on the total weight of the coagulation bath.

3. The process of claims 1 or 2 wherein said polybenzimidazole polymer consists essentially of recurring units of the formula:

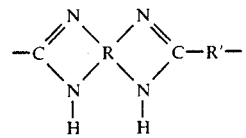

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

4. The process of claims 1 or 2 wherein said polybenzimidazole polymer consists essentially of recurring units of the formula:

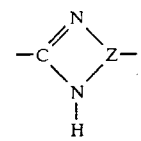

wherein Z is an aromatic nucleus having the nitrogen atoms forming the benzimidazole ring paired upon adjacent carbon atoms of the aromatic nucleus.

5. The process of claims 1 or 2 wherein said polybenzimidazole polymer is poly-2,2'-(m-phenylene)-5,5'-bibenzimidazole.

6. The process of claims 1 or 2 wherein said solvent for said solvent solution of said polybenzimidazole polymer is selected from the group consisting of N,N-dimethylacetamide, N,N-dimethyl formamide, dimethyl sulfoxide and N-methyl-2-pyrrolidone.

7. The process of claim 6 wherein said solvent is N,N-dimethylacetamide.

8. The process of claims 1 or 2 wherein said polybenzimidazole polymer is present in said solvent solution in a concentration of about 5 to about 30 percent by weight based upon the total weight of said solvent solution containing said solvent and said polybenzimidazole.

9. The process of claims 1 or 2 wherein said film is deposited on said support at a thickness of about 0.5 to 30.0 mils.

10. The process of claim 9 wherein said thickness is about 1.0 to 10.0 mils.

11. The process of claims 1 or 2 wherein said non-solvent in the coagulation bath is water and said in the coagulation bath solvent is N,N-dimethylacetamide.

12. The process of claims 1 or 2 wherein the non-solvent in the coagulation bath is water and the solvent in the coagulation bath is an acid.

13. The process of claim 12 wherein the acid is selected from the group consisting of acetic acid, formic acid, and sulfuric acid or mixture thereof.

14. The process of claims 1 or 2 wherein the coagulation bath is maintained in the temperature range of about 0° C. to 40° C.

15. The process of claims 1 or 2 wherein the coagulation bath is at a temperature of about 20° to 30° C.

16. A semipermeable membrane produced in accordance with the process of claims 1 or 2.

* * * * *